US012627945B2

(12) United States Patent
Kwarteng

(10) Patent No.: US 12,627,945 B2
(45) Date of Patent: May 12, 2026

(54) METHODS AND SYSTEMS FOR GENERATING COMPUTING GEO-BOUNDARIES FOR MOTION ANALYSIS IN A COMPLEX COMPUTING NETWORK

(71) Applicant: TIMEERO LLC, Chandler, AZ (US)

(72) Inventor: Barima Kwarteng, Chandler, AZ (US)

(73) Assignee: Timeero LLC, Chandler, AZ (US)

( * ) Notice: Subject to any disclaimer, the term of this patent is extended or adjusted under 35 U.S.C. 154(b) by 258 days.

(21) Appl. No.: 18/404,425

(22) Filed: Jan. 4, 2024

(65) Prior Publication Data

US 2024/0298142 A1     Sep. 5, 2024

Related U.S. Application Data

(60) Provisional application No. 63/437,188, filed on Jan. 5, 2023.

(51) Int. Cl.
*H04W 4/02* (2018.01)
*H04W 4/021* (2018.01)
*H04W 4/029* (2018.01)

(52) U.S. Cl.
CPC ........... *H04W 4/027* (2013.01); *H04W 4/021* (2013.01); *H04W 4/023* (2013.01); *H04W 4/029* (2018.02)

(58) Field of Classification Search
CPC ..... H04W 4/021; H04W 4/023; H04W 4/027; H04W 4/029; H04W 4/02; H04W 64/00;

H04W 4/025; H04W 64/003; H04W 4/024; G06F 16/29; G06F 16/9537; G06F 16/487; G06F 16/909; H04L 67/52; H04L 51/222

See application file for complete search history.

(56) References Cited

U.S. PATENT DOCUMENTS

| | | | |
|---|---|---|---|
| 9,544,728 B2 * | 1/2017 | Carmel | H04W 4/021 |
| 10,433,107 B1 * | 10/2019 | Zhao | H04W 4/021 |
| 11,570,583 B2 * | 1/2023 | Chang | H04L 67/53 |

* cited by examiner

*Primary Examiner* — Anthony S Addy
(74) *Attorney, Agent, or Firm* — Baker & McKenzie LLP

(57) ABSTRACT

The disclosed methods are directed to generating computing geo-boundaries for motion analysis in a complex computing network. The methods include receiving geo-coordinate data of a first geographical location of a first electronic device and a second geographical location of the first electronic device and using same to generate a first computing geo-boundary and a second computing geo-boundary. The methods also include receiving first motion data including device velocity data and device location data associated with a first electronic device traversing a first distance between the first location and the second location. In addition, the methods include determining a first kinematic correlation between the first motion data and one or more of the first computing geo-boundary or the second computing geo-boundary to generate motion analysis data. The methods also include initiating, using the motion analysis data, formatting of the motion analysis data for rendering a visualization on the first electronic device.

20 Claims, 7 Drawing Sheets

RECEIVING GEO-COORDINATE DATA OF A FIRST GEOGRAPHICAL LOCATION ASSOCIATED WITH A FIRST ELECTRONIC DEVICE AND A SECOND GEOGRAPHICAL LOCATION ASSOCIATED WITH THE FIRST ELECTRONIC DEVICE
302

GENERATING, USING THE GEO-COORDINATE DATA, A FIRST COMPUTING GEO-BOUNDARY FOR THE FIRST GEOGRAPHICAL LOCATION AND A SECOND COMPUTING GEO-BOUNDARY FOR THE SECOND GEOGRAPHICAL LOCATION
304

RECEIVING FIRST MOTIVE DATA INCLUDING DEVICE VELOCITY DATA AND DEVICE LOCATION DATA ASSOCIATED WITH A FIRST ELECTRONIC DEVICE TRAVERSING A FIRST DISTANCE BETWEEN A FIRST LOCATION AND A SECOND LOCATION
306

EVALUATING A KINETIC CORRELATION BETWEEN THE FIRST MOTIVE DATA AND ONE OR MORE OF THE FIRST COMPUTING GEO-BOUNDARY OR THE SECOND COMPUTING GEO-BOUNDARY TO GENERATE MOTIVE ANALYSIS DATA
308

INITIATING, USING THE MOTIVE ANALYSIS DATA, FORMATTING OF THE MOTIVE ANALYSIS DATA FOR RENDERING A VISUALIZATION ON THE FIRST ELECTRONIC DEVICE
310

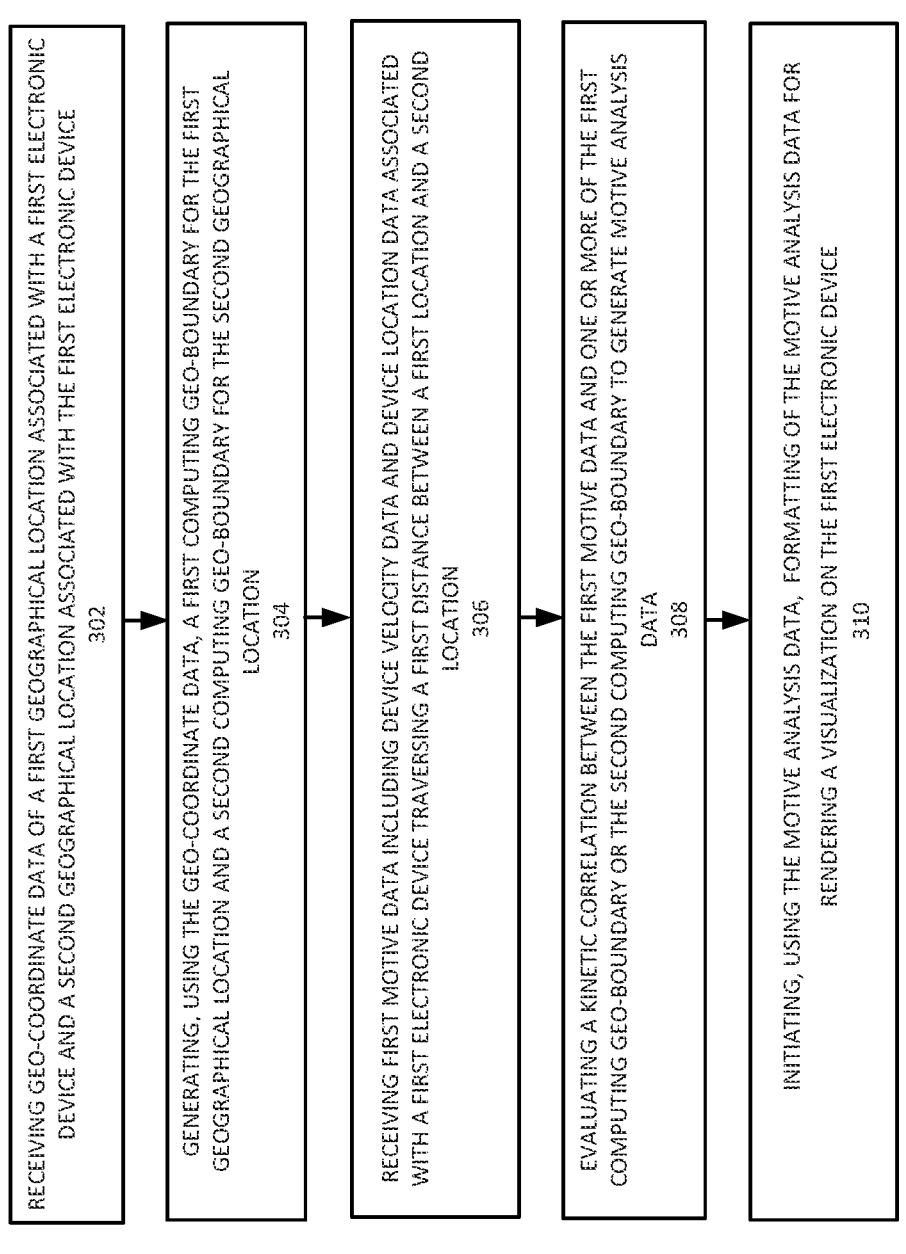

RECEIVING GEO-COORDINATE DATA OF A FIRST GEOGRAPHICAL LOCATION ASSOCIATED WITH A FIRST ELECTRONIC DEVICE AND A SECOND GEOGRAPHICAL LOCATION ASSOCIATED WITH THE FIRST ELECTRONIC DEVICE
302

GENERATING, USING THE GEO-COORDINATE DATA, A FIRST COMPUTING GEO-BOUNDARY FOR THE FIRST GEOGRAPHICAL LOCATION AND A SECOND COMPUTING GEO-BOUNDARY FOR THE SECOND GEOGRAPHICAL LOCATION
304

RECEIVING FIRST MOTIVE DATA INCLUDING DEVICE VELOCITY DATA AND DEVICE LOCATION DATA ASSOCIATED WITH A FIRST ELECTRONIC DEVICE TRAVERSING A FIRST DISTANCE BETWEEN A FIRST LOCATION AND A SECOND LOCATION
306

EVALUATING A KINETIC CORRELATION BETWEEN THE FIRST MOTIVE DATA AND ONE OR MORE OF THE FIRST COMPUTING GEO-BOUNDARY OR THE SECOND COMPUTING GEO-BOUNDARY TO GENERATE MOTIVE ANALYSIS DATA
308

INITIATING, USING THE MOTIVE ANALYSIS DATA, FORMATTING OF THE MOTIVE ANALYSIS DATA FOR RENDERING A VISUALIZATION ON THE FIRST ELECTRONIC DEVICE
310

FIG. 3

METHODS AND SYSTEMS FOR GENERATING COMPUTING GEO-BOUNDARIES FOR MOTION ANALYSIS IN A COMPLEX COMPUTING NETWORK

CROSS-REFERENCE TO RELATED APPLICATIONS

This application claims priority to U.S. Provisional Patent App. No. 63/437,188, filed on Jan. 5, 2023, and titled "Methods And Systems For Generating Computing Geo-Boundaries For Motion Analysis In A Complex Computing Network," which is incorporated herein by reference in its entirety for all purposes.

BACKGROUND

There is a need for generating geo-boundaries and conducting motion analysis associated with computing devices in complex computing networks.

BRIEF SUMMARY

Disclosed are methods, systems, and computer programs for generating computing geo-boundaries for motion analysis in a complex computing network. According to an embodiment, a method for generating computing geo-boundaries for motion analysis in a complex computing network comprises: receiving geo-coordinate data of a first geographical location associated with a first electronic device and a second geographical location associated with the first electronic device; and generating, using the geo-coordinate data, a first computing geo-boundary for the first geographical location and a second computing geo-boundary for the second geographical location, wherein: the first computing geo-boundary includes a first locus associated with the first geographical location such that a first configurable geo-distance parameter extends from the first locus to one or more symmetric or asymmetric points of a first geometric perimeter surrounding the first geographical location while the second computing geo-boundary includes a second locus associated with the second geographical location such that a second configurable geo-distance parameter extends from the second locus to one or more symmetric or asymmetric points of a second geometric perimeter surrounding the second geographical location.

The method further comprises: receiving first motion data including device velocity data and device location data associated with a first electronic device traversing a first distance between the first geographical location and the second geographical location; and determining a first kinematic correlation between the first motion data and one or more of the first computing geo-boundary or the second computing geo-boundary to generate motion analysis data. The first kinematic correlation, for example, includes: determining a proximal relationship between the first computing geo-boundary and the second computing geo-boundary relative to the first distance, and determining a stationary status of the first electronic device based on the device velocity data of the first electronic device within one or more of the first geometric perimeter or the second geometric perimeter.

The method also includes initiating, using the motion analysis data, formatting of the motion analysis data for rendering a visualization on the first electronic device, the visualization indicating one or more of: travel time data associated with traversing the first distance; travel distance data associated with traversing the first distance; and stationary duration data associated with the first electronic device being stationary within one of the first geometric perimeter or the second geometric perimeter.

In other embodiments, a system and a computer program can include or execute the method described above. These and other implementations may each optionally include one or more of the following features.

The first configurable geo-distance parameter or the second configurable geo-distance parameter is adjustable in latitude, longitude, and altitude.

Prior to receiving the geo-coordinate data, a first display element associated with a graphical user interface of the first electronic device is activated to initiate at least receiving the geo-coordinate data.

Moreover, prior to determining the first kinematic correlation between the first motion data and one or more of the first computing geo-boundary or the second computing geo-boundary, a second display element of a graphical user interface of the first electronic device is activated to initiate determining the first kinematic correlation between the first motion data and one or more of the first computing geo-boundary or the second computing geo-boundary.

According to one embodiment, the disclosed method further includes receiving second motion data including device velocity data and device location data associated with the first electronic device traversing: the first distance between the first geographical location and the second geographical location; a second distance between the second geographical location and a third geographical location; and a third distance between the third geographical location and a fourth geographical location.

The method also includes determining a second kinematic correlation between the second motion data with one or more of the first computing geo-boundary, the second computing geo-boundary, a third computing geo-boundary associated with the third geographical location, and a fourth computing geo-boundary associated with the fourth geographical location to generate the motion analysis data, wherein the second kinematic correlation includes determining a proximal relationship between: the first computing geo-boundary and the second computing geo-boundary relative to the first distance; the second computing geo-boundary and the third computing geo-boundary relative to the second distance; and the third computing geo-boundary and the fourth computing geo-boundary relative to the third distance.

The method also includes determining a stationary status of the first electronic device based on device velocity data of the first electronic device within one or more of the first geometric perimeter, or the second geometric perimeter, or a third geometric perimeter of the third computing geo-boundary, or a fourth geometric perimeter of the fourth computing geo-boundary. In some embodiments, the method includes initiating, using the motion analysis data, formatting of the motion analysis data for rendering a visualization on the first electronic device. The visualization may indicate one or more of: travel time data associated with traversing the first distance, the second distance, and the third distance; travel distance data associated with traversing the first distance, the second distance, and the third distance; or stationary duration data associated with the first electronic device being stationary within one or more of the first geometric perimeter, the second geometric perimeter, the third geometric perimeter, or the fourth geometric perimeter.

In exemplary implementations, the disclosed method includes: receiving third motion data including device velocity data and device location data associated with a second electronic device traversing a plurality of distances between a plurality of geographical locations including the first geographical location and the second geographical location; and determining a third kinematic correlation between the third motion data and a plurality of computing geo-boundaries including the first computing geo-boundary and the second computing geo-boundary to generate the motion analysis data. The third kinematic correlation, for example, includes: determining a proximal relationship between the plurality of computing geo-boundaries relative to the plurality of distances traversed by the second electronic device; and determining a stationary status of the second electronic device based on device velocity data of the second electronic device within the plurality of computing geo-boundaries.

The methods also include initiating, using the motion analysis data, formatting of the motion analysis data for rendering a visualization on the first electronic device or the second electronic device, the visualization indicating one or more of: travel time data associated with traversing the plurality of distances; travel distance data associated with traversing the plurality of distances; or stationary duration data associated with the second electronic device being stationary within one or more computing geo-boundaries comprised the plurality of computing geo-boundaries.

In some embodiments, the first computing geo-boundary is resolvable into two components based on adjusting the first configurable geo-distance parameter in latitude and longitude to form the first geometric perimeter, the first geometric perimeter including a two-dimensional digital wall surrounding the first geographical location.

In other embodiments, the first computing geo-boundary is resolvable into three components based on adjusting the first configurable geo-distance parameter in latitude, longitude, and altitude to form the first geometric perimeter, the first geometric perimeter including a three-dimensional digital wall encapsulating the first geographical location.

Furthermore, determining a proximal relationship between the first computing geo-boundary and the second computing geo-boundary includes determining whether the first geometric perimeter surrounding the first geographical location intersects with the second geometric perimeter surrounding the second geographical location.

Moreover, in response to determining a region of intersection between the first geometric perimeter and the second geometric perimeter, the method includes designating the region of intersection as a nonstationary region for the first electronic device, the nonstationary region indicating a geographic region within which a stationary status of the first electronic device is indeterminable.

In addition, determining a proximal relationship between the first computing geo-boundary and the second computing geo-boundary includes determining that the first geometric perimeter and the second geometric perimeter are distally located relative to each other such that there is no region of intersection between the first geometric perimeter and the second geometric perimeter, the stationary status of the first electronic device being determined within one of the first geometric perimeter or the second geometric perimeter.

In exemplary implementations, the first electronic device includes one or more of: a global positioning system sensor; an accelerometer sensor; or a timer device.

In some cases, the first electronic device comprises one of: a mobile computing device; a tablet computing device; or a laptop computing device.

Furthermore, determining the stationary status of the first electronic device comprises analyzing the device velocity data for a first-time duration to determine that the device velocity data for the first-time duration is zero or falls below a non-zero threshold.

In some instances, one or more of the first configurable geo-distance parameter or the second configurable geo-distance parameter is adjustable in latitude, longitude, or altitude based on one or more user inputs selecting: a first numerical value for the latitude; a second numerical value for the longitude; or a third numerical value for the altitude.

The method of claim 1, wherein the one or more computing device processors is comprised in a cloud computing platform.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

FIG. 3 depicts a flowchart for generating computing geo-boundaries for motion analysis in a complex computing network.

DETAILED DESCRIPTION

The figures and descriptions provided may have been simplified to illustrate aspects that are relevant for a clear understanding of the described devices, systems, and methods, while eliminating, for the purpose of clarity, other aspects that may be found in typical similar devices, systems, and methods.

The terminology used in this disclosure is for the purpose of describing particular exemplary embodiments only and is not intended to be limiting. For example, as used, the singular forms "a", "an" and "the" may be intended to include plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The described method steps, processes, and operations are not to be construed as necessarily requiring their performance in the particular order discussed or illustrated, unless specifically identified as an order of performance. It is further appreciated that additional or alternative steps may be employed according to some implementations.

Although the terms first, second, third, etc., may be used to describe various elements, components, regions, layers and/or sections, these elements, components, regions, layers and/or sections should not be limited by these terms. These terms may be used to distinguish one element, component, region, layer, or section from another element, component, region, layer, or section. That is, terms such as "first," "second," and other numerical terms, when used in this disclosure, do not imply a sequence or order unless clearly indicated by the context. In addition, the term optimal and its variants (e.g., efficient, optimally, etc.) as used in this disclosure may simply indicate improving, rather than the ultimate form of 'perfection' or the like.

System Environment

Figure 1:
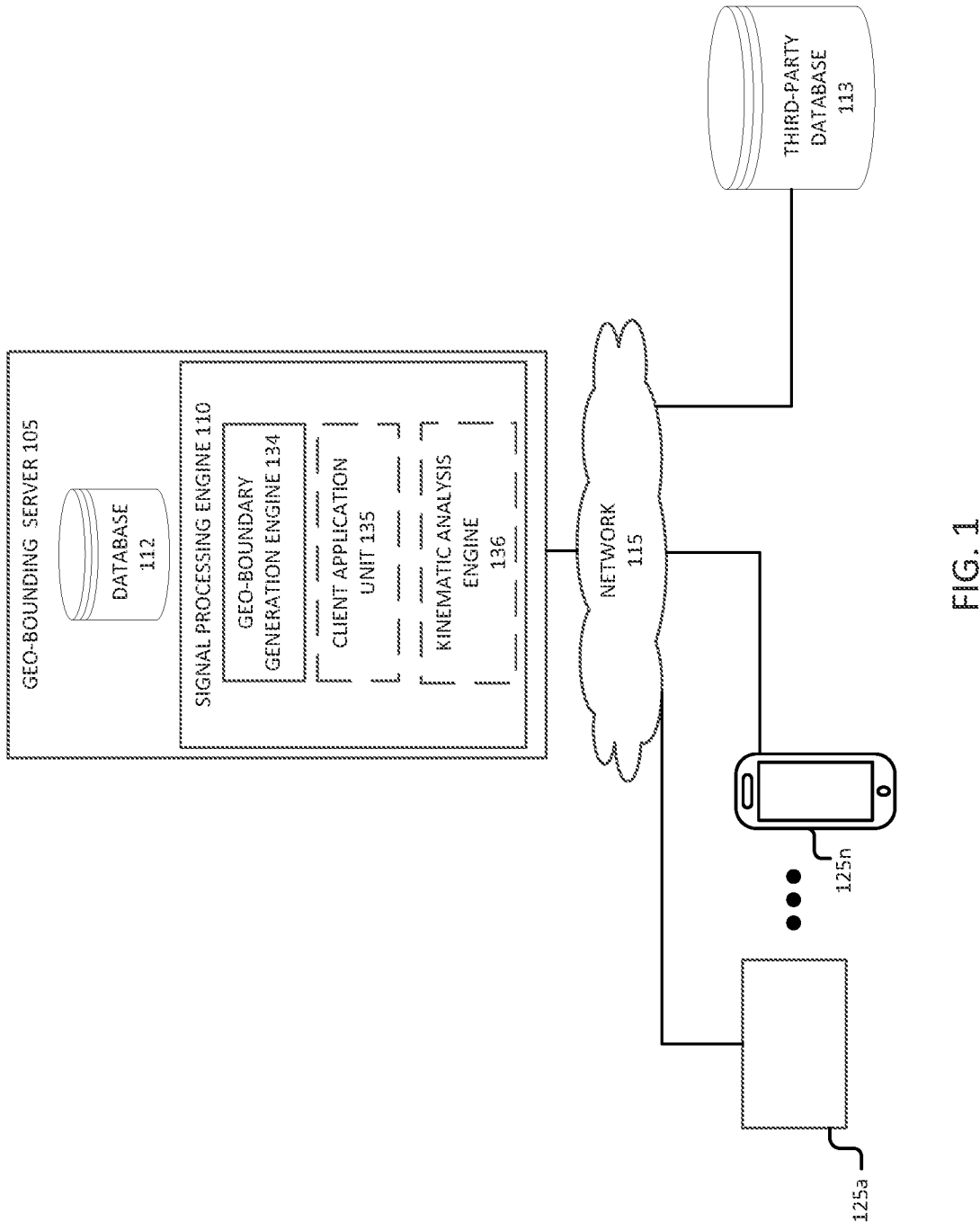
FIG. 1 shows an exemplary network system for generating computing geo-boundaries for motion analysis in a complex computing network.

Illustrated in FIG. 1 is an exemplary network system 100 for executing the principles disclosed. In the illustrated implementation, the system 100 may include a geo-bounding server 105 communicatively coupled to one or more data partner systems that include one or more display devices 125a, . . . , 125n communicatively coupled via a network 115. While a single geo-bounding server 105 is illustrated, the disclosed principles and techniques could be expanded to include multiple geo-bounding servers 105.

According to one embodiment, the geo-bounding server 105 includes a computing device such as a content server, a communication server, a laptop computer, a desktop computer, a handheld computing device, a tablet computing device, a virtual machine, a cloud-based computing solution and/or a cloud-based service, and/or the like. The geo-bounding server 105 may include a plurality of computing devices configured to communicate with one another and/or implement the techniques described herein. Further, the geo-bounding server 105 may include a database 112 and a signal processing engine configured to receive geo-coordinate data, generate computing geo-boundaries, and analyze motion data of a device as further discussed below.

The database 112 may be configured to store user data such as user credential data as well as data associated with the signal processing engine 110. The database 112 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis.

The signal processing engine may comprise instructions stored in memory and executed by one or more computing device processors to implement a plurality of operations associated with the geo-bounding server 105. According to one embodiment, the signal processing engine comprises a geo-boundary generation engine 134, a client application unit 135, and a kinematic analysis engine 136. The geo-boundary generation engine 134 may be used to generate a plurality of multi-dimensional computing geo-boundaries that can be resolved into two or more components. The client application unit 135 facilitates the generation of one or more visualizations that may be displayed on display devices 125a, . . . , 125n. The kinematic analysis engine 136 is configured to analyze motion data such as velocity data, stationary duration data, etc., associated with a user and correlate same with data associated with the geo-boundary generation engine. These aspects are further discussed in conjunction with the flowchart of FIG. 3.

The display devices 125a, . . . , 125n may include one or more computing systems associated with the data partner systems. According to one embodiment, the display devices 125a, . . . , 125n may be handheld computing devices, smart phones, tablets, phablets, laptop computers, personal digital assistants (PDAs), smart devices, wearable electronic devices, biometric devices, computer servers, virtual servers, virtual machines, computing devices coupled to vehicles, and/or communication servers. In some embodiments, the display devices 125a, . . . , 125n may include a plurality of computing devices configured to communicate with one another and/or implement the techniques described in this disclosure. It is appreciated that visualizations associated with executing one or more operations by the signal processing engine may be generated on one or more display devices 125a, . . . , 125n for viewing by a user, according to some embodiments.

The third-party database 113 may include one or more storage device associated with the one or more display devices 125a, . . . , 125n. For example, the third-party database 112 may store data associated with a specific third-party or specific user in response to the user interacting via a display device 125 with the geo-bounding server 105. It is contemplated that the third-party database 113 may include a stand-alone database that is separate from, or redundant to a storage database of a display device 125 or some other data partner system for data backup and other legacy or tracking operations associated with the data partner system. In addition, the third-party database 113 may include non-volatile memory or similar permanent storage device and media. For example, the third-party server 112 can be a hard disk drive, a CD-ROM device, a DVD-ROM device, a DVD-RAM device, a DVD-RW device, a flash memory device, solid state media, or some other mass storage device known in the art for storing information on a more permanent basis.

The network 115 may include a plurality of networks. For instance, the network 115 may include any wired and/or wireless communication network that facilitates communication between the geo-bounding server 105, the display devices 125a, . . . , 125n, the third-party database 112, and other data partner systems. The network 115, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like. As used herein, the data partner systems comprise computing devices and systems associated with the display devices 125a, . . . , 125n and used by users (e.g., data partners) to access or otherwise interact with data associated with the geo-bounding server 105. According to one implementation, the network 115 is a complex network comprising a plurality of nodes (e.g., electronic devices and systems) interconnected to each other and may be characterized by a plurality of network protocols, device relationships (e.g., devices belonging to a given organization being sectioned and secured for communication among themselves), device types, device interaction patterns, etc.

Figure 2:
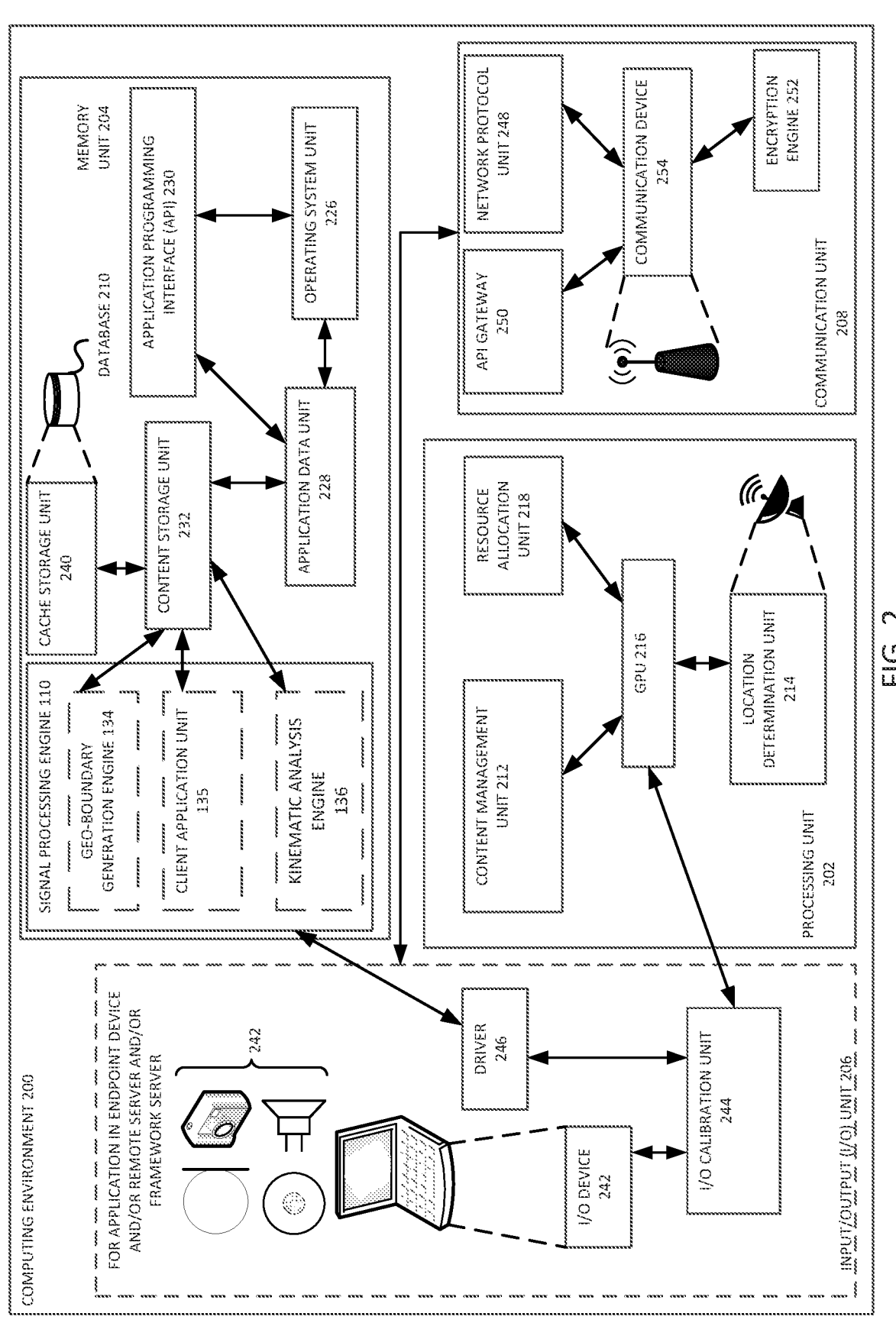
FIG. 2 illustrates a functional block diagram of a computing environment for generating computing geo-boundaries for motion analysis in a complex computing network.

FIG. 2 illustrates a functional system diagram of a computing environment 200 which can be used to implement the geo-bounding server 105 and data partner systems including display devices 125a, . . . , 125n. The computing environment 200 and any units and/or subunits of FIG. 2 may be included in one or more elements of the system 100 as described in association with FIG. 1. The computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically-purposed hardware as the case may be.

The processing unit 202 may control one or more of the memory unit(s) 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described as being performed by a processor may be taken by the processing unit 202 of FIG. 2 alone and/or by the processing unit 202 in conjunction with one or more additional processors, units, subunits, elements, components, devices, and/or the like. Further, while one processing unit 202 may be shown in FIG. 2, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, geo-coordinate content, media content, or any combination thereof. In some instances, content on which the content management unit 212 may operate includes device information, user interface data, images, text, themes, audio files, video files, documents, and/or the like. Additionally, the content management unit 212 may control (e.g., format) the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data such as geo-event data or analysis data or other output data. In some embodiments, the GPU 216 may be used to render content for presentation on a computing device via, for example, a graphical display device or a graphical user interface (GUI) of the display device 125. The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests (e.g., requests associated with conducting motion analysis operations). The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data (e.g., geo-models, event analysis data, visualization data, etc.) during operations of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself. Moreover, the memory unit may store code for implementing the geo-boundary generation engine 134, the client application unit 135, and the kinematic analysis engine 136.

The memory unit 204 may include various types of data storage media such as solid-state storage media, hard disk storage media, virtual storage media, and/or the like. Memory unit 204 may include dedicated hardware elements such as hard drives and/or servers, as well as software elements such as cloud-based storage drives. In some implementations, memory unit 204 may include a random-access memory (RAM) device, a dynamic random-access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described in this disclosure. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage. Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 includes one or more databases 210 for storing any data described herein. For example, depending on the implementation, the one or more databases 210 may be used as the database 112 or the third-party database 112 shown in FIG. 1. In some embodiments, the memory unit 204 and/or its subunits may be local relative to the geo-bounding server 105 and/or the display devices 125a, . . . , 125n, and/or remotely located relative to the geo-bounding server 105 and/or to the display devices 125a, . . . , 125n.

Turning back to FIG. 2, the memory unit 204 may include subunits such as an operating system unit 226, an application data unit 228, an application programming interface (API) unit 230, a content storage unit 232, and a cache storage unit 240. Each of the aforementioned subunits of the memory unit 204 may be communicatively and/or otherwise operably coupled with each other and to other units and/or subunits of the computing environment 200. It is also noted that the memory unit 204 may include other modules, instructions, or code that facilitate the execution of the techniques described. For instance, the memory unit 204 may include one or more modules such as signal processing engine 110 with its sub-modules.

The operating system unit 226 may facilitate deployment, storage, access, execution, and/or utilization of an operating system used by computing environment 200 and/or any other computing environment described in this disclosure. In some embodiments, operating system unit 226 may include various hardware and/or software elements that serve as a structural platform for the processing unit 202 to execute various operations described herein. Operating system unit

226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the display device 125 may be required to download, install, access, and/or otherwise use a software application (e.g., web application such as an application associated with the geo-bounding server 105) to facilitate performance of the various operations discussed in association with FIG. 3. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described in this disclosure. For example, computing environment 200 may include one or more APIs for various devices, applications, units, subunits, elements, and/or other computing environments to communicate with each other and/or use the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the geo-bounding server 105 and/or the display device 125, and/or the data partner system 110 to communicate with each other.

The content storage unit 232 may facilitate deployment, storage, access, and/or utilization of information associated with performance of geo-event data analysis operations and/or geo-bounding processes by computing environment 200 and/or any other computing environment described. In some embodiments, content storage unit 232 may communicate with content management unit 212 to receive and/or transmit content files (e.g., visualization data, etc.).

The cache storage unit 240 may facilitate short-term deployment, storage, access, analysis, and/or use of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the processes described herein. For example, elements of the I/O unit 206 may be used to receive input from a user of the display device 125. As described, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described in this disclosure. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally, and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations provided in this disclosure.

The I/O calibration unit 244 may facilitate the calibration of the I/O device 242. For example, I/O calibration unit 244 may detect and/or determine one or more settings of I/O device 242, and then adjust and/or modify settings and/or optimize viewing of a graphical user interface and/or one or more visualizations so that the I/O device 242 may operate more efficiently. According to some embodiments, the I/O calibration unit 244 may be used to format visualizations (e.g., visualizations of geo-models) by resolving the geo-model data into multi-dimensional components and rendering a multi-dimensional image on the display device 125 for viewing by a first user.

In some embodiments, the I/O calibration unit 244 may use a driver 246 (or multiple drivers) to calibrate I/O device 242. For example, driver 246 may include software that is installed by I/O calibration unit 244 so that an element of computing environment 200 (or an element of another computing environment) may recognize and/or integrate with I/O device 242 for disclosed processes.

The communication unit 208 may facilitate establishment, maintenance, monitoring, and/or termination of communications between computing environment 200 and other computing environments, third party server systems, and/or the like (e.g., between the geo-bounding server 105 and the display device 125 or between the geo-bounding server 105 and other data partner systems). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/ or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing geo-event data analysis operations and/or geo-model generation operations and/or data visualization operations and/or other processes provided in this disclosure.

The API gateway 250 may allow other devices and/or computing environments to access API unit 230 of memory unit 204 of computing environment 200. For example, a display device 125 may access API unit 230 of computing environment 200 via API gateway 250. In some embodiments, API gateway 250 may be required to validate user credentials associated with a user of a display device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Embodiments

FIG. 3 shows an exemplary flowchart that is executable by one or more computing device processors to generate computing geo-boundaries for motion analysis in a complex computing network. At block 302, a signal processing engine associated with the one or more computing device processors receives geo-coordinate data of a first geographical location (e.g., location A in FIG. 4B) associated with a first electronic device and a second geographical location (e.g., location B in FIG. 4B) associated with the first electronic device.

A geo-boundary generation engine of the signal processing engine may generate, using the geo-coordinate data, a first computing geo-boundary (e.g., boundary/perimeter 404 of FIG. 4B) for the first geographical location and a second computing geo-boundary (e.g., boundary/perimeter 406 of FIG. 4B) for the second geographical location at block 304. The first computing geo-boundary includes a first locus (e.g., a central locus or an internal reference point to a geometric perimeter of a geo-boundary) associated with the first geographical location such that a first configurable geo-distance parameter extends from the first locus to one or more symmetric or asymmetric points of a first geometric perimeter surrounding the first geographical location. The second computing geo-boundary, according to one embodiment, includes a second locus (e.g., central locus or an internal reference point to a geometric perimeter of a geo-boundary) associated with the second geographical location such that a second configurable geo-distance parameter extends from the second locus to one or more symmetric or asymmetric points of a second geometric perimeter surrounding the second geographical location.

At block 306, the signal processing engine may receive first motion data including device velocity data and/or device location data associated with a first electronic device traversing a first distance between the first geographical location and the second geographical location.

In addition, the signal processing engine may determine, at block 308, a first kinematic correlation between the first motion data and one or more of the first computing geo-boundary or the second computing geo-boundary to generate motion analysis data. The first kinematic correlation may include determining a proximal relationship (e.g., closeness or nearness between two or more computing geo-boundaries) between the first computing geo-boundary and the second computing geo-boundary relative to the first distance. According to one implementation, the first kinematic correlation operation is executed by a kinematic analysis engine of the signal processing engine. The first kinematic correlation may also include determining a stationary status of the first electronic device based on the device velocity data of the first electronic device within one or more of the first geometric perimeter or the second geometric perimeter.

Moreover, a client application unit of the signal processing engine may, at block 310, initiate using the motion analysis data, formatting of the motion analysis data for rendering a visualization on the first electronic device. The visualization, according to one embodiment, indicates one or more of: travel time data associated with traversing the first distance; travel distance data associated with traversing the first distance; or stationary duration data associated with the first electronic device being stationary within one of the first geometric perimeter or the second geometric perimeter.

These and other implementations may each optionally include one or more of the following features. The first configurable geo-distance parameter or the second configurable geo-distance parameter is adjustable in latitude, longitude, and altitude according to some embodiments.

Furthermore, prior to receiving the geo-coordinate data, a first display element associated with a graphical user interface of the first electronic device is activated to initiate at least receiving the geo-coordinate data.

In addition, prior to determining the first kinematic correlation between the first motion data and one or more of the first computing geo-boundary or the second computing geo-boundary, a second display element of a graphical user interface of the first electronic device is activated to initiate determining the first kinematic correlation between the first motion data and one or more of the first computing geo-boundary or the second computing geo-boundary.

In other embodiments, prior to receiving the geo-coordinate data, the various stages of the flowchart of FIG. 3 are automatically initiated or otherwise automatically executed based on a first time of day (e.g., Ante Meridiem (AM) hours such as 7:00 AM, 8:00, 9:00 AM, etc.) and automatically terminated or otherwise ended based on a second time of day (e.g., Post Meridiem (PM) hours such as 5:00 PM, 6:00 PM, 7:00 PM, etc.). In such cases, there is no activation of any display element to initiate or terminate the various stages of the flowchart of FIG. 3. In other words, the processes of FIG. 3 may be automatically initiated at the first time of day and automatically terminated at the second time of day. In some implementations, the processes of FIG. 3 are initiated by a single activation of a display element associated with the first electronic device or a second electronic device at the first time of day such that the first electronic device or the second electronic device traverses a plurality of locations (e.g., a first location, a second location, a third location, a fourth location, a fifth location, etc.) prior to the second time of day. In such cases, a display element associated with the first electronic device, or the second electronic device may be activated once, at the second time of day, to terminate the processes of FIG. 3. Thus, a user of the first electronic device or the second electronic device need not activate or reactive the display element for each location traversed thereby greatly optimizing user time and eliminating redundancies associated multiple activations and reactivations of display elements to initiate or terminate the processes outlined in FIG. 3.

Figure 5A:
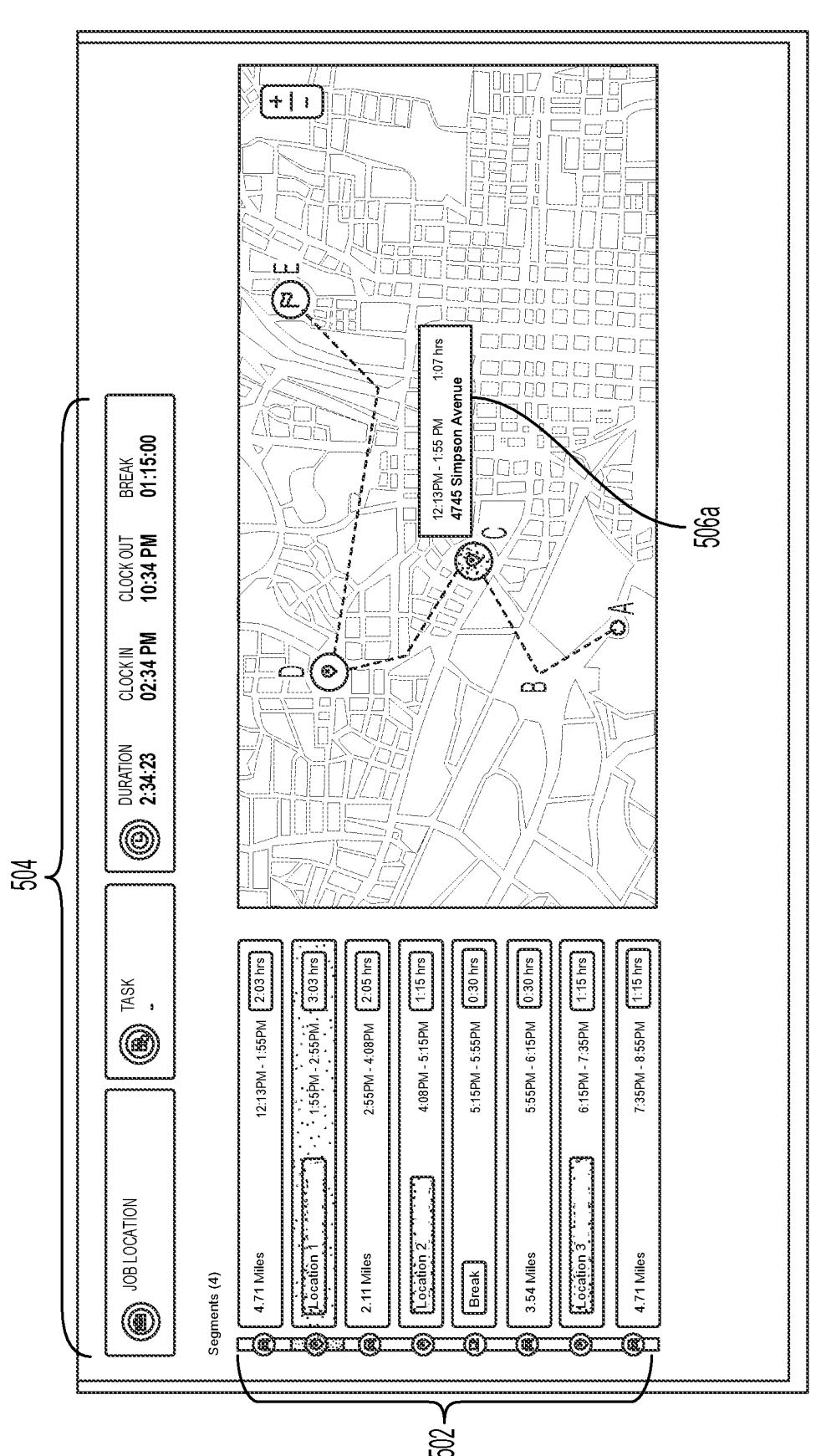
FIGS. 5A-5B show exemplary visualizations of motion analysis data.
Figure 5B:
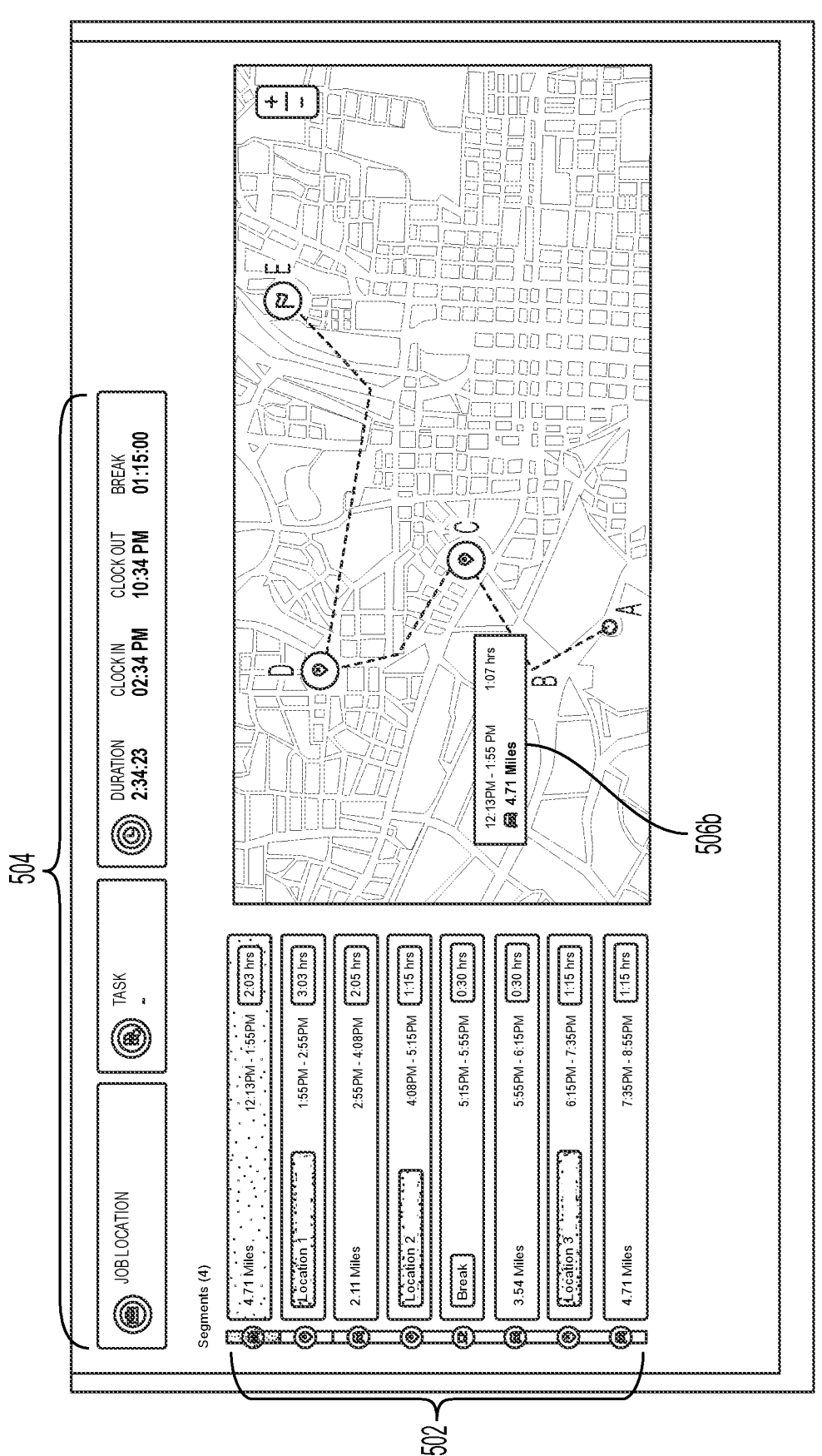

In addition, once the steps of FIG. 3 are executed, a notification including the visualization discussed in association with step 310 or the visualizations of FIGS. 5A and 5B are automatically transmitted to the first electronic device at, for example, the second time of day.

According to some implementations, the flowchart of FIG. 3 may include receiving, using the signal processing engine, second motion data including device velocity data and device location data associated with the first electronic device traversing: the first distance between the first geographical location and the second geographical location; a second distance between the second geographical location and a third geographical location; and a third distance between the third geographical location and a fourth geographical location.

The flowchart of FIG. 3 may further include determining, using the signal processing engine, a second kinematic correlation between the second motion data with one or more of the first computing geo-boundary, the second computing geo-boundary, and a third computing geo-boundary associated with the third geographical location, and a fourth computing geo-boundary associated with the fourth geographical location to generate the motion analysis data.

According to one embodiment, the second kinematic correlation includes determining a proximal relationship between: the first computing geo-boundary and the second computing geo-boundary relative to the first distance; the second computing geo-boundary and the third computing geo-boundary relative to the second distance; and the third computing geo-boundary and the fourth computing geo-boundary relative to the third distance.

The second kinematic correlation, according to some implementations includes determining a stationary status of the first electronic device based on device velocity data of the first electronic device within one or more of the first geometric perimeter, or the second geometric perimeter, or a third geometric perimeter of the third computing geo-boundary, or a fourth geometric perimeter of the fourth computing geo-boundary.

The signal processing engine may also be used to further initiate, using the motion analysis data, formatting of the motion analysis data for rendering a visualization on the first electronic device. The visualization may indicate one or more of: travel time data associated with traversing the first distance, the second distance, and the third distance; travel distance data associated with traversing the first distance, the second distance, and the third distance; or stationary duration data associated with the first electronic device being stationary within one or more of the first geometric perimeter, the second geometric perimeter, the third geometric perimeter, or the fourth geometric perimeter.

According to some implementations, the flowchart of FIG. 3 includes receiving, using the signal processing engine, third motion data including device velocity data and device location data associated with a second electronic device traversing a plurality of distances between a plurality of locations including the first geographical location and the second geographical location. The signal processing engine may determine, a third kinematic correlation between the third motion data and a plurality of computing geo-boundaries including the first computing geo-boundary and the second computing geo-boundary to generate the motion analysis data. The third kinematic correlation may include: determining a proximal relationship between the plurality of computing geo-boundaries relative to the plurality of distances traversed by the second electronic device; and determining a stationary status of the second electronic device based on device velocity data of the second electronic device within the plurality of computing geo-boundaries. In some cases, the signal processing engine, may initiate, using the motion analysis data, formatting of the motion analysis data for rendering a visualization on the first electronic device or the second electronic device. The visualization may indicate one or more of: travel time data associated with traversing the plurality of distances; travel distance data associated with traversing the plurality of distances; or stationary duration data associated with the second electronic device being stationary within one or more computing geo-boundaries comprised the plurality of computing geo-boundaries.

According to one embodiment, the first computing geo-boundary is resolvable into two components based on adjusting the first configurable geo-distance parameter in latitude and longitude to form the first geometric perimeter, such that the first geometric perimeter includes a two-dimensional digital wall (e.g., see FIGS. 4A and 4D) surrounding the first geographical location.

In other embodiments, the first computing geo-boundary is resolvable into three components based on adjusting the first configurable geo-distance parameter in latitude, longitude, and altitude to form the first geometric perimeter such that the first geometric perimeter includes a three-dimensional digital wall (e.g., see FIG. 4C) encapsulating, encompassing, or wholly surrounding from a plurality of directions, the first geographical location.

In some embodiments, determining a proximal relationship between the first computing geo-boundary and the second computing geo-boundary includes determining whether the first geometric perimeter surrounding the first geographical location intersects with the second geometric perimeter surrounding the second geographical location. In response to determining a region of intersection (e.g., intersection region 405 of FIG. 4B) between the first geometric perimeter and the second geometric perimeter, the region of intersection may be designated, by the signal processing engine, as a nonstationary region for the first electronic device such that the nonstationary region indicates one of: a geographic region within which a stationary status of the first electronic device is indeterminable; or a geographic region designated as a nonstationary region for the first electronic device or the second electronic device.

Moreover, determining a proximal relationship between the first computing geo-boundary and the second computing geo-boundary includes determining that the first geometric perimeter and the second geometric perimeter are distally located relative to each other such that there is no region of intersection between the first geometric perimeter and the second geometric perimeter. In such cases, the stationary status of the first electronic device may be determined within one of the first geometric perimeter or the second geometric perimeter.

It is appreciated that the first geometric parameter or the second geometric perimeter may have a multi-dimensional shape such as having a two-dimensional shape or a three-dimensional shape or outline, or outer boundary, or outer surface, according to some embodiments. For example, the multi-dimensional shape may be based on one or more symmetric points of the first geometric perimeter or the second geometric perimeter. In the case of one or more symmetric points, the multi-dimensional shape may include a shape of a circle or a shape of a sphere. In the case of one or more asymmetric points, the multi-dimensional shape may include a shape of a polygon (e.g., a square, a triangle, a pentagon, a hexagon, etc.) or a shape of cube, a cuboid, a prism, a cylinder, etc.

In addition, the first electronic device may include one or more of: a global positioning system sensor; an accelerometer sensor; or a timer device.

Furthermore, the first electronic device may comprise one of: a mobile computing device; a wearable computing device such as a digital wristwatch; a tablet computing device; or a laptop computing device. Other electronic devices such as computing devices fitted to vehicles, aircrafts, bicycles, motorcycles, etc., are also herein contemplated as being exemplary first electronic devices.

In addition, determining the stationary status of the first electronic device may comprise analyzing the device velocity data for a first time duration to determine that the device velocity data for the first time duration is zero or is below a numerical velocity threshold (e.g. less than 1 m/s, or less than 2 m/s or less than 3 m/s or less than 4 m/s or less than 5 m/s). Moreover, one or more of the first configurable geo-distance parameter or the second configurable geo-distance parameter (e.g., a point (e.g., point 401 or point 415) within the first computing geo-boundary that extends to points (e.g., points 402a, 402b, in FIG. 4A and points 416a, and 416b of FIG. 4D) on the first computing geo-boundary) is dynamically adjustable or adaptable in latitude, longitude, or altitude based on one or more user inputs (e.g., inputs indicating distance data) selecting: a first numerical value for the latitude; a second numerical value for the longitude, or a third numerical value for the altitude. This beneficially allows configuring, shaping, contouring, or adapting the computing geo-boundaries in such a way as to enable isolating or independently identifying specific geo-locations for the kinematic correlations and thereby optimize elimination of false-positive kinematic correlation results.

In some cases, adjusting the first or second configurable geo-distance parameter enables minimization and/or elimination of intersecting regions between the first geographical location and the second geographical location, for example, so as to speed up the computation of the kinematic correlation operations.

It is appreciated that the one or more processors associated with the signal processing engine, or the one or more computing device processors executing the signal processing engine may be comprised in a cloud computing platform.

Figure 4A:
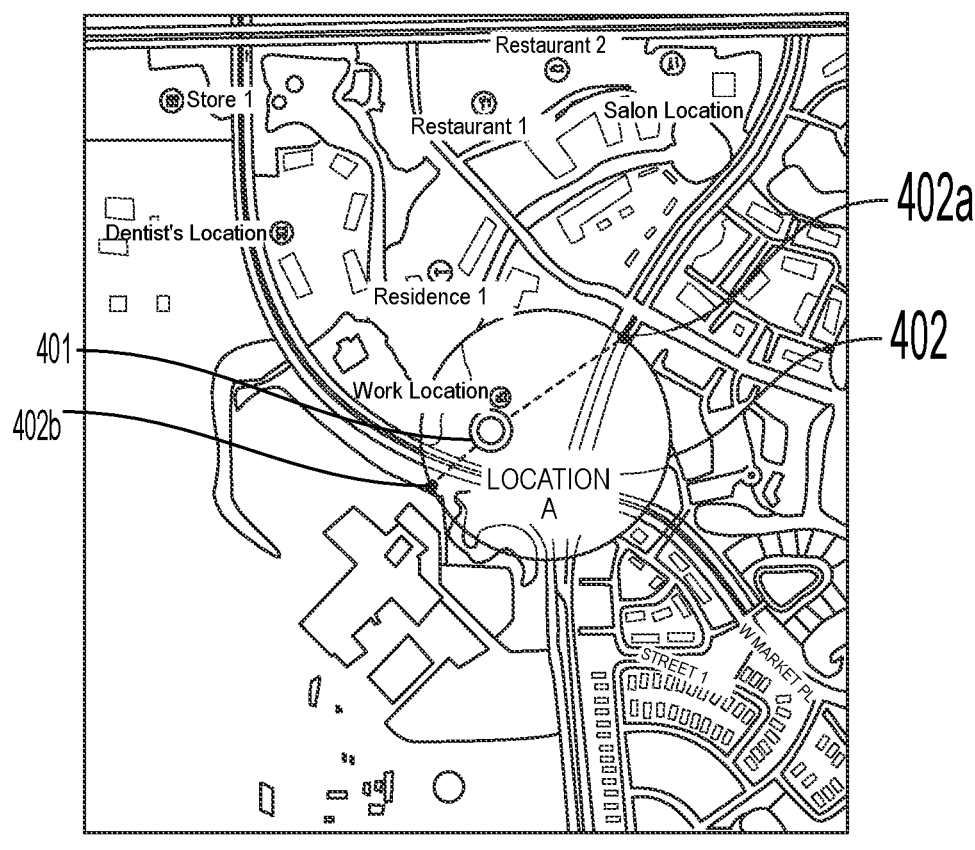
FIGS. 4A-4D show visualizations of exemplary computing geo-boundaries.

FIGS. 4A-4D show exemplary visualizations associated with the geo-boundaries referenced in FIG. 3. In particular, FIG. 4A shows a geo-boundary 402 surrounding a location (e.g., location A) for which the processes of FIG. 3 may be executed. In one embodiment, the geo-boundary 402 may have a central locus 401 or an internal reference point 401 relative to symmetric or asymmetric points (e.g., points 402a and 402b) disposed about a perimeter of the geo-boundary 402.

Figure 4B:
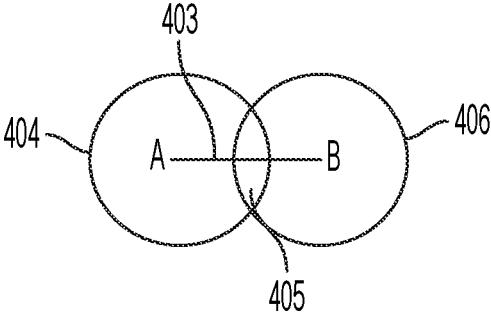

In FIG. 4B, an electronic device (associated with a user or a vehicle) traverses the distance 403 between points A and B which have geo-boundaries 404 and 406, respectively. As seen in the figure, the geo-boundaries 404 and 406 have a region of intersection 405 for which a stationary status of the electronic device is indeterminable. In some embodiments, the region of intersection 405 comprises a nonstationary region for the electronic device traversing locations A and B.

Figure 4C:
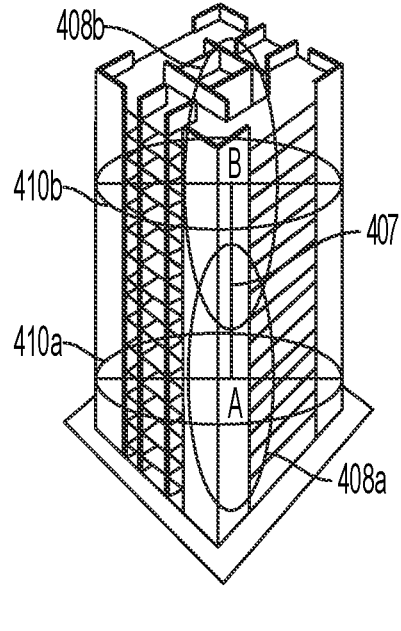

FIG. 4C shows an instance where an electronic device traverses a distance 407 between locations A and B. As can be seen in the figure, location A has geo-boundaries 408a and 410a while location B has geo-boundaries 408b and 410b. As can be appreciated from the figure, the geo-boundaries of location A, for example, can be resolved in longitude and latitude using geo-boundary 410. Moreover, geo-boundary 408a provides an azimuthal resolution of location A relative to location B. Thus, if, for example, location A represents a first floor of a skyrise building, location B may represent a second floor or a third floor or a fourth floor of the skyrise building.

Figure 4D:
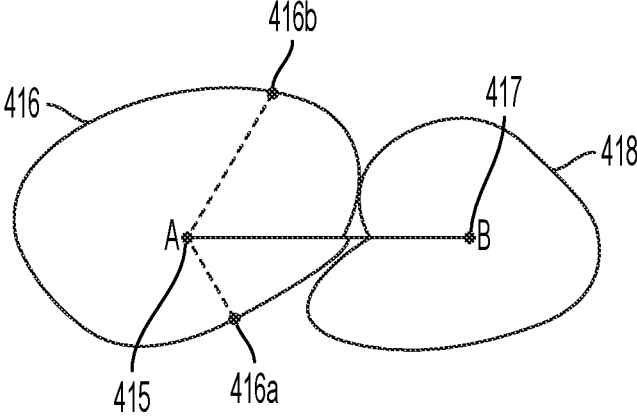

FIG. 4D shows an exemplary implementation where the geo-boundaries of location A and B are irregularly shaped in order to further distinguish or otherwise eliminate any point of intersection between locations A and B. In particular, location A is surrounded or bounded by geo-boundary 416 while location B is bounded by geo-boundary 418. This beneficially speeds up the processes of FIG. 3 as there are no points of intersection that drive indeterminate stationary statuses of an electronic device traversing points A and B. As can be seen in the figure, location A has a central locus 415 or an internal reference point 415 while location B has a central locus 417 or an internal reference point 417. Furthermore, points 416a and 416b show asymmetric points of the geo-boundary 416 relative to the internal reference point 415 of location A. According to some embodiments, the geo-boundaries 416 and 418 may be any shape. For example, the geo-boundaries 416 and 418 may be adapted to have two dimensional shapes including shapes associated with a square, a rectangle, a triangle, a circle, a semi-circle, a polygon, a parallelogram, a rhombus, a trapezium, a kite, or a combination of any of these shapes. Moreover, the geo-boundaries 416 and 418 can be adapted to have three dimensional shapes including shapes associated with a sphere, a cube, a cuboid, a cone, a cylinder, or a polyhedron, or a combination of the afore mentioned three-dimensional shapes.

FIGS. 5A and 5B show exemplary visualizations of motion analysis data, mentioned above, that have been formatted for rendering on the first electronic device or a display device associated with the network system 100 of FIG. 1. In particular, the visualizations of FIGS. 5A and 5B includes motion analysis data comprising granular summary data 502 that breaks-down or otherwise atomizes location data summaries for each location (e.g., locations A, B, C, D, E) traversed by a given electronic device. The granular summary data 502, according to one embodiment, includes distance data of a first location traversed by the electronic device relative to a second location traversed by the electronic device. The granular summary data may also include identifiers for each location traversed by the electronic device as well as temporal stationary status data (e.g., amount of time spent by the electronic device at a given location) for each of said locations.

Moreover, the visualizations shown in FIGS. 5A and 5B comprise motion analysis data representing travel summary data that indicate an overall information associated with the electronic device traversing the location A to location E. The travel summary data may provide information on the type of job or operation executed by a user traversing, for example, location A to location E, the total time is took the user to travel from location A to location E, up-times (e.g., active hours) versus down-times (breaks) taken by the user associated with the electronic device, etc.

In some embodiments, the visualizations of FIGS. 5A and 5B are adapted to dynamically display location data (e.g., location data 506a and 506b) when a display element (e.g., cursor) associated with an electronic device on which visualizations FIGS. 5A and 5B are displayed is hovered over a given location. In some embodiments, a user may simply touch or otherwise activate icons or other display elements associated with a given location comprised in the one or more locations traversed by the electronic device following which the location data is generated on a display system of the electronic device. In one embodiment, the location data may indicate travel time associated with geo-boundaries of the one or more locations, distance data associated with distances traversed by the electronic device between two or more locations, etc.

In exemplary implementations, the processes of FIG. 3 may be automatically initiated and terminated based on the time of day as previously discussed above. In other implementations, the processes of FIG. 3 may be initiated and terminated based on a single activation and/or deactivation of a display element associated with the electronic device traversing one or more locations. In additional embodiments, the disclosed process of FIG. 3 may be automatically initiated when the electronic device enters a particular geo-boundary and automatically terminated when the electronic device exits said particular geo-boundary. It is appreciated that the foregoing ways of initiating and/or terminating the workflow of FIG. 3 may be combined as needed to optimize hardware usage as well as other technological infrastructure supporting the implementation of FIG. 3.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is appreciated that the scope of the present disclosure be limited not by this detailed description, but rather by the claims of this application. The present disclosure may be embodied in other specific forms without departing from the spirit or essential characteristics thereof. Accordingly, the above discussed subject-matter is illustrative, but not limiting, of the scope of the present disclosure, which is set forth in the following claims.

What is claimed is:

1. A method for generating computing geo-boundaries for motion analysis in a complex computing network, the method comprising:

receiving, using one or more computing device processors, geo-coordinate data of a first geographical location associated with a first electronic device and a second geographical location associated with the first electronic device, generating, using the one or more computing device processors and the geo-coordinate data, a first computing geo-boundary for the first geographical location and a second computing geo-boundary for the second geographical location, wherein:

the first computing geo-boundary includes a first locus associated with the first geographical location such that a first configurable geo-distance parameter extends from the first locus to one or more symmetric or asymmetric points of a first geometric perimeter surrounding the first geographical location, the second computing geo-boundary includes a second locus associated with the second geographical location such that a second configurable geo-distance parameter extends from the second locus to one or more symmetric or asymmetric points of a second geometric perimeter surrounding the second geographical location, receiving, using the one or more computing device processors, first motion data including device velocity data and device location data associated with a first electronic device traversing a first distance between the first geographical location and the second geographical location;

determining, using the one or more computing device processors, a first kinematic correlation between the first motion data and one or more of the first computing geo-boundary or the second computing geo-boundary to generate motion analysis data, wherein the first kinematic correlation includes:

determining a proximal relationship between the first computing geo-boundary and the second computing geo-boundary relative to the first distance, and determining a stationary status of the first electronic device based on the device velocity data of the first electronic device within one or more of the first geometric perimeter or the second geometric perimeter, initiating, using the one or more computing device processors and the motion analysis data, formatting of the motion analysis data for rendering a visualization on the first electronic device, the visualization indicating one or more of:

travel time data associated with traversing the first distance, travel distance data associated with traversing the first distance, and stationary duration data associated with the first electronic device being stationary within one of the first geometric perimeter or the second geometric perimeter.

2. The method of claim 1, wherein the first configurable geo-distance parameter or the second configurable geo-distance parameter is adjustable in latitude, longitude, and altitude.

3. The method of claim 1, wherein prior to receiving the geo-coordinate data, a first display element associated with a graphical user interface of the first electronic device is activated to initiate at least receiving the geo-coordinate data.

4. The method of claim 1, wherein prior to determining the first kinematic correlation between the first motion data and one or more of the first computing geo-boundary or the second computing geo-boundary, a second display element of a graphical user interface of the first electronic device is activated to initiate determining the first kinematic correlation between the first motion data and one or more of the first computing geo-boundary or the second computing geo-boundary.

5. The method of claim 1, further comprising:

receiving, using the one or more computing device processors, second motion data including device velocity data and device location data associated with first electronic device traversing:

the first distance between the first geographical location and the second geographical location, a second distance between the second geographical location and a third geographical location, a third distance between the third geographical location and a fourth geographical location;

determining, using the one or more computing device processors, a second kinematic correlation between the second motion data with one or more of the first computing geo-boundary, the second computing geo-boundary, a third computing geo-boundary associated with the third geographical location, and a fourth computing geo-boundary associated with the fourth geographical location to generate the motion analysis data, wherein the second kinematic correlation includes:

determining a proximal relationship between:

the first computing geo-boundary and the second computing geo-boundary relative to the first distance, the second computing geo-boundary and the third computing geo-boundary relative to the second distance, and the third computing geo-boundary and the fourth computing geo-boundary relative to the third distance;

determining a stationary status of the first electronic device based on device velocity data of the first electronic device within one or more of the first geometric perimeter, or the second geometric perimeter, or a third geometric perimeter of the third computing geo-boundary, or a fourth geometric perimeter of the fourth computing geo-boundary; and initiating, using the computer processor and the motion analysis data, formatting of the motion analysis data for rendering a visualization on the first electronic device, the visualization indicating one or more of:

travel time data associated with traversing the first distance, the second distance, and the third distance, travel distance data associated with traversing the first distance, the second distance, and the third distance, or stationary duration data associated with the first electronic device being stationary within one or more of the first geometric perimeter, the second geometric perimeter, the third geometric perimeter, or the fourth geometric perimeter.

6. The method of claim 1, further comprising:

receiving, using the one or more computing device processors, third motion data including device velocity data and device location data associated with a second electronic device traversing a plurality of distances between a plurality of geographical locations including the first geographical location and the second geographical location;

determining, using the one or more computing device processors, a third kinematic correlation between the third motion data and a plurality of computing geo-boundaries including the first computing geo-boundary and the second computing geo-boundary to generate the motion analysis data, wherein the third kinematic correlation includes:

determining a proximal relationship between the plurality of computing geo-boundaries relative to the plurality of distances traversed by the second electronic device, determining a stationary status of the second electronic device based on device velocity data of the second electronic device within the plurality of computing geo-boundaries; and initiating, using the computer processor and the motion analysis data, formatting of the motion analysis data for rendering a visualization on the first electronic device or the second electronic device, the visualization indicating one or more of:

travel time data associated with traversing the plurality of distances, travel distance data associated with traversing the plurality of distances, or stationary duration data associated with the second electronic device being stationary within one or more computing geo-boundaries comprised the plurality of computing geo-boundaries.

7. The method of claim 1, wherein the first computing geo-boundary is resolvable into two components based on adjusting the first configurable geo-distance parameter in latitude and longitude to form the first geometric perimeter, the first geometric perimeter including a two-dimensional digital wall surrounding the first geographical location.

8. The method of claim 1, wherein the first computing geo-boundary is resolvable into three components based on adjusting the first configurable geo-distance parameter in latitude, longitude, and altitude to form the first geometric perimeter, the first geometric perimeter including a three-dimensional digital wall encapsulating the first geographical location.

9. The method of claim 1, wherein determining a proximal relationship between the first computing geo-boundary and the second computing geo-boundary includes determining whether the first geometric perimeter surrounding the first geographical location intersects with the second geometric perimeter surrounding the second geographical location.

10. The method of claim 9, wherein in response to determining a region of intersection between the first geometric perimeter and the second geometric perimeter, designating the region of intersection as a nonstationary region for the first electronic device, the nonstationary region indicating a geographic region within which a stationary status of the first electronic device is indeterminable.

11. The method of claim 1, wherein determining a proximal relationship between the first computing geo-boundary and the second computing geo-boundary includes determining that the first geometric perimeter and the second geometric perimeter are distally located relative to each other such that there is no region of intersection between the first geometric perimeter and the second geometric perimeter, the stationary status of the first electronic device being determined within one of the first geometric perimeter or the second geometric perimeter.

12. The method of claim 1, wherein the first electronic device includes one or more of:

a global positioning system sensor, an accelerometer sensor, or a timer device.

13. The method of claim 1, wherein the first electronic device comprises one of:

a mobile computing device, a tablet computing device, or a laptop computing device.

14. The method of claim 1, wherein determining the stationary status of the first electronic device comprises analyzing the device velocity data for a first-time duration to determine that the device velocity data for the first-time duration is zero.

15. The method of claim 1, wherein one or more of the first configurable geo-distance parameter or the second configurable geo-distance parameter is adjustable in latitude, longitude, or altitude based on one or more user inputs selecting:

a first numerical value for the latitude, a second numerical value for the longitude, or a third numerical value for the altitude.

16. The method of claim 1, wherein the one or more computing device processors is comprised in a cloud computing platform.

17. A system for generating computing geo-boundaries for motion analysis in a complex computing network, the system comprising:

a computer processor, and memory storing instructions that are executable by the computer processor to:

receive geo-coordinate data of a first geographical location associated with a first electronic device and a second geographical location associated with the first electronic device, generate, using the geo-coordinate data, a first computing geo-boundary for the first geographical location and a second computing geo-boundary for the second geographical location, wherein:

the first computing geo-boundary includes a first locus associated with the first geographical location such that a first configurable geo-distance parameter extends from the first locus to one or more symmetric or asymmetric points of a first geometric perimeter surrounding the first geographical location, the second computing geo-boundary includes a second locus associated with the second geographical location such that a second configurable geo-distance parameter extends from the second locus to one or more symmetric or asymmetric points of a second geometric perimeter surrounding the second geographical location, receive first motion data including device velocity data and device location data associated with a first electronic device traversing a first distance between the first geographical location and the second geographical location;

determine a first kinematic correlation between the first motion data and one or more of the first computing geo-boundary or the second computing geo-boundary to generate motion analysis data, wherein the first kinematic correlation includes:

determining a proximal relationship between the first computing geo-boundary and the second computing geo-boundary relative to the first distance, and determining a stationary status of the first electronic device based on the device velocity data of the first electronic device within one or more of the first geometric perimeter or the second geometric perimeter, initiate, using the motion analysis data, formatting of the motion analysis data for rendering a visualization on the first electronic device, the visualization indicating one or more of:

travel time data associated with traversing the first distance, travel distance data associated with traversing the first distance, or stationary duration data associated with the first electronic device being stationary within one of the first geometric perimeter or the second geometric perimeter.

18. The system of claim 17, wherein the first configurable geo-distance parameter or the second configurable geo-distance parameter is adjustable in latitude, longitude, and altitude.

19. The system of claim 17, wherein prior to receiving the geo-coordinate data, a first display element associated with a graphical user interface of the first electronic device is activated to initiate at least receiving the geo-coordinate data.

20. The system of claim 17, wherein the system is comprised in a cloud computing platform.

* * * * *